(12) United States Patent
Ehlers et al.

(10) Patent No.: US 9,532,100 B2
(45) Date of Patent: Dec. 27, 2016

(54) SYSTEMS AND METHODS FOR SELECTING SOUND LOGOS FOR MEDIA CONTENT

(71) Applicant: Rovi Guides, Inc., Santa Clara, CA (US)

(72) Inventors: Geoff Ehlers, Santa Rosa, CA (US); James Roth, Novato, CA (US); Matthew Dymek, Wynnewood, PA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/674,165

(22) Filed: Mar. 31, 2015

(65) Prior Publication Data
US 2016/0295273 A1 Oct. 6, 2016

(51) Int. Cl.
*H04H 60/43* (2008.01)
*H04N 21/431* (2011.01)
*H04N 21/439* (2011.01)
*H04N 21/442* (2011.01)
*H04N 21/466* (2011.01)
*H04N 21/81* (2011.01)
*H04N 21/432* (2011.01)
*H04N 21/482* (2011.01)
*H04N 21/8355* (2011.01)
*H04N 21/84* (2011.01)

(52) U.S. Cl.
CPC ........ *H04N 21/4312* (2013.01); *H04N 21/439* (2013.01); *H04N 21/4325* (2013.01); *H04N 21/44222* (2013.01); *H04N 21/4662* (2013.01); *H04N 21/4667* (2013.01); *H04N 21/4826* (2013.01); *H04N 21/4828* (2013.01); *H04N 21/8106* (2013.01); *H04N 21/8133* (2013.01); *H04N 21/8153* (2013.01); *H04N 21/8355* (2013.01); *H04N 21/84* (2013.01)

(58) Field of Classification Search
CPC combination set(s) only.
See application file for complete search history.

(56) References Cited

U.S. PATENT DOCUMENTS 8,689,273 B2 * 4/2014 Reisman .......... G06F 17/30873
725/110
2010/0153885 A1 6/2010 Yates

FOREIGN PATENT DOCUMENTS

WO WO-9945702 A1 9/1999

OTHER PUBLICATIONS

International Search Report, PCT Application No. PCT/US2016/024711, mailed Jul. 7, 2016 (12 pages).

* cited by examiner

*Primary Examiner* — Kieu Oanh T Bui
(74) *Attorney, Agent, or Firm* — Ropes & Gray LLP

(57) ABSTRACT

Methods and systems are disclosed herein for a media guidance application that presents an appropriate audio cue based on a search request received from a user. For example, the media guidance application may determine that a media asset corresponding to the search request is of particular relevance to the user (e.g., it belongs to the user's favorite genre). The media guidance application may then determine an audio cue (e.g., a well-known sound effect) associated with the media asset and generate the audio cue for presentation. The media guidance application may also determine an animated image cue associated with the media asset and generate that for display as well. This may allow users, especially those with vision-related disabilities, to more easily identify media assets that may be particularly relevant to them.

20 Claims, 5 Drawing Sheets

SYSTEMS AND METHODS FOR SELECTING SOUND LOGOS FOR MEDIA CONTENT

BACKGROUND

In conventional systems, users are able to access a plethora of media assets. Typically, these assets are accompanied by logos or other images that identify the assets. However, visual space is often limited, and additional visual logos can further clutter this space and make it harder for users, especially those with vision-related disabilities, to interact with the media assets.

SUMMARY

Accordingly, methods and systems are disclosed herein for a media guidance application that presents additional information used to identify a media asset without cluttering already limited space. Additionally, the media guidance application presents additional information that is accessible to even a user with vision-related disabilities. To achieve this, the media guidance application may communicate the additional information through the use of one or more audio cues. In particular, the media guidance application may automatically select and generate for presentation an appropriate audio cue based on a search request received from a user. For example, the media guidance application may determine that a media asset corresponding to the search request is of particular relevance to the user (e.g., it belongs to the user's favorite genre). The media guidance application may then determine an audio cue (e.g., a well-known sound effect) associated with the particular relevance and generate the audio cue for presentation. By doing so, the media guidance application may provide the user with additional information about the media asset, aid the user in recognizing the media asset, or trigger an emotional connection between the user and the media asset.

In some aspects, a media guidance application may receive (e.g., using control circuitry) a user request for media content based on a criterion. For example, the media guidance application may receive a user request for media content from a given provider (e.g., HBO), from a certain period of time (e.g., the past month), playable on a given device (e.g., a smartphone), or from a given series (e.g., "Star Wars"). The media guidance application may then cross-reference (e.g., using control circuitry) the criterion with a database (e.g., a remote server) listing information about various media assets to determine a list of media assets matching the criterion. Using the previous examples, the media guidance application may determine a list of media assets from the past month or from the "Star Wars" series.

The media guidance application may then select (e.g., using control circuitry), from the list of media assets, a first media asset. For example, the media guidance application may select the first media asset from the list of media assets. In another example, the media guidance application may determine that a given media asset is of particular relevance to the user and will select that media asset.

The media guidance application may then cross-reference (e.g., using control circuitry) the first media asset with the database (e.g., the same remote server) to determine a first audio cue for the first media asset. For example, the media guidance application may cross-reference the first media asset with the database to determine that a well-known sound effect, marketing jingle, or theme is associated with the first media asset and thus an appropriate first audio cue. The media guidance application may then simultaneously generate (e.g., using control circuitry) for presentation (e.g., on user equipment) the list of media assets and the first audio cue. This may be done without any further user input. Returning to a previous example, the media guidance application may simultaneously generate for presentation a list of "Star Wars" movies along with a sound effect of a lightsaber being turned on. The media guidance application may not require that the user navigate to a listing, such as a listing for "Star Wars Episode 1: The Phantom Menace" before generating the audio cue for presentation.

In some embodiments, the media guidance application may generate the audio cue or a list of audio cues for presentation in response to receiving a user command related to a media asset currently being viewed. For example, the media guidance application may generate the audio cue for presentation if the media guidance application detects (e.g., using control circuitry) a command to enter a trick play mode (e.g., to fast-forward through the media asset). In another example, if the media guidance application detects (e.g., using control circuitry) a command to pause the media asset, the media guidance application may generate for display a list of available audio cues. If the media guidance application detects that the user has selected one of the available audio cues, the media guidance application may generate that audio cue for presentation or store an indication that the selected audio cue is the preferred audio cue for the media asset.

In some embodiments, the media guidance application may provide non-audio content in addition to or as an alternative to the audio cue. For example, the media guidance application may cross-reference (e.g., using control circuitry) the first media asset with the database (e.g., the remote server) to determine a first animated image cue corresponding to the first media asset. For example, the media guidance application may cross-reference the first media asset with the database to determine that a certain clip, shot, logo, or other image is related to the media asset. The animated image cue may correspond to the audio cue as well (i.e., they may both be from the same clip or otherwise match). The media guidance application may then generate (e.g., using control circuitry) the first animated image cue for display (e.g., on user equipment) simultaneously with the presentation of the list of media assets and the first audio cue. For example, the media guidance application may simultaneously generate for display a short clip of a lightsaber being turned on along with the presentation of the sound effect of a lightsaber being turned on and the list of "Star Wars" movies.

In some embodiments, the media guidance application may base the presentation of an audio cue on a commonly taken navigation path. For example, the media guidance application may monitor (e.g., using control circuitry) received user navigation commands over a period of time and determine a commonly taken navigation path based on those commands. Specifically, the media guidance application may track navigation commands (e.g., opening the guide, traversing through a list of channels or providers, etc.) over a specified period of time (e.g., over the past week or since the device was first connected) and determine that a certain set of commands (i.e., defining a path) are often given together. For example, the media guidance application may determine that, over the past month, the monitored user navigation commands often correspond to traversal through a list of search results to a certain set of media assets. The media guidance application may then modify the audio cues that are presented in response to determining that a user is proceeding down a commonly taken navigation path.

For example, the media guidance application may receive (e.g., using control circuitry) a user input navigating to a second media asset of the list of media assets. For example, the media guidance application may receive a user input that scrolls through the list of search results. The media guidance application may then determine whether the user input corresponds to the commonly taken navigation path. If so, the media guidance application may not present audio cues as the user is already familiar with the menus and sub-menus (e.g., making the audio cues redundant).

In some embodiments, the media guidance application may present audio cues based on the position of a media asset in a list of search requests. For example, the media guidance application may, in response to user navigating from a first media asset to a second media asset, cross-reference (e.g., using control circuitry) the second media asset with the database (e.g., the remote server) to determine a second media cue for the second media asset and generate the second audio cue for presentation (e.g., at user equipment). Thus, the media guidance application may repeat the process performed for the first media asset and the first audio cue when navigating to the second media asset. In some cases, the media guidance application may only generate audio cues beyond the first audio cue for presentation if a sufficient number of audio cues are available. The media guidance application may determine this by comparing the number of available audio cues to a threshold (which may be set according to default programming, by the user, or by any other suitable method or entity).

In some embodiments, the media guidance application may determine (e.g., using control circuitry) a category of content to which the user request corresponds. For example, the media guidance application may determine that a user request for "Star Wars" movies may correspond to the "Science-Fiction" category but not to the "Children's Shows" category. The media guidance application may then retrieve a set of audio cue playback rules for the category of content and base the presentation of the first audio cue on the set of playback rules as opposed to the media asset itself. For example, if the list of media assets contains both action movies and children's shows, the media guidance application may not play certain audio cues (e.g., explosions) based on the playback rules for the "Children's Shows" category.

In some embodiments, the media guidance application may determine (e.g., using control circuitry) whether the set of audio cue playback rules allows for additional playbacks of audio cues. If it does, the media guidance application may cause additional playbacks of the first audio cue. For example, the media guidance application may determine that the playback rules for the "Children's Shows" category allows for multiple playbacks of audio cues, and so it may cause additional playbacks of the first audio cue as further commands are received. The media guidance application may also disable (e.g., using control circuitry) additional playbacks after a period of time. For example, the media guidance application may disable additional audio cue playbacks after two minutes.

In some embodiments, the media guidance application may determine (e.g., using control circuitry) a preferred media asset, corresponding to user preferences, from the list of media assets. The media guidance application may then select the first media asset in response to determining that the first media asset corresponds to the preferred media asset. For example, the media guidance application may determine that the user enjoys new movies based on the user's profile. Returning to a previous example, the media guidance application may determine that a trailer for "Star Wars Episode VII: The Force Awakens" would be a preferred media asset for a user request for "Star Wars" movies. The media guidance application may then select the trailer for "Star Wars Episode VII: The Force Awakens" as the first media asset for cross-referencing to determine an audio cue (or the only media asset in the list that is associated with a presented audio cue).

In some embodiments, the media guidance application may, in response to determining that no audio cue is available for the first media asset, cross-reference (e.g., using control circuitry) the first media asset with the database (e.g., the remote server) to determine a sound associated with the media asset. For example, the media guidance application may determine, based on this operation, that no audio cue is available but that a certain sound is commonly associated with the media asset. The media guidance application may then extract the sound from the first media asset for use as the first audio cue. For example, the media guidance application may access an available on-demand version of the media asset, locate the identified sound, and extract it.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
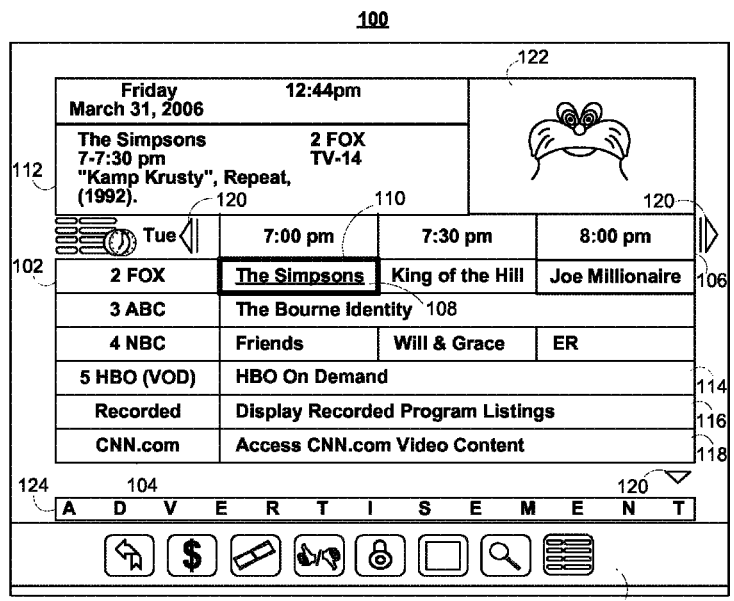
FIG. 1 shows an illustrative example of a display screen generated by a media guidance application in accordance with some embodiments of the disclosure.

Accordingly, methods and systems are disclosed herein for a media guidance application that presents an audio cue. In particular, the media guidance application may automatically select and generate for presentation an appropriate audio cue based on a search request received from a user. For example, the media guidance application may determine that a media asset corresponding to the search request is of particular relevance to the user (e.g., it belongs to the user's favorite genre). The media guidance application may then determine an audio cue (e.g., a well-known sound effect) associated with the media asset and generate the audio cue for presentation. By doing so, the media guidance application may provide the user with additional information about the media asset, aid the user in recognizing the media asset, or trigger an emotional connection between the user and the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
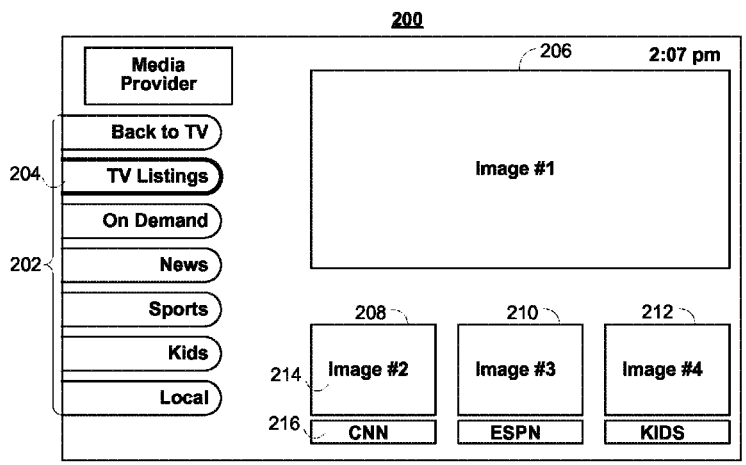
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
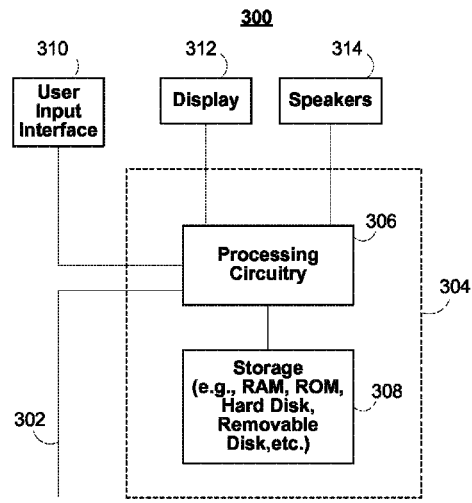
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
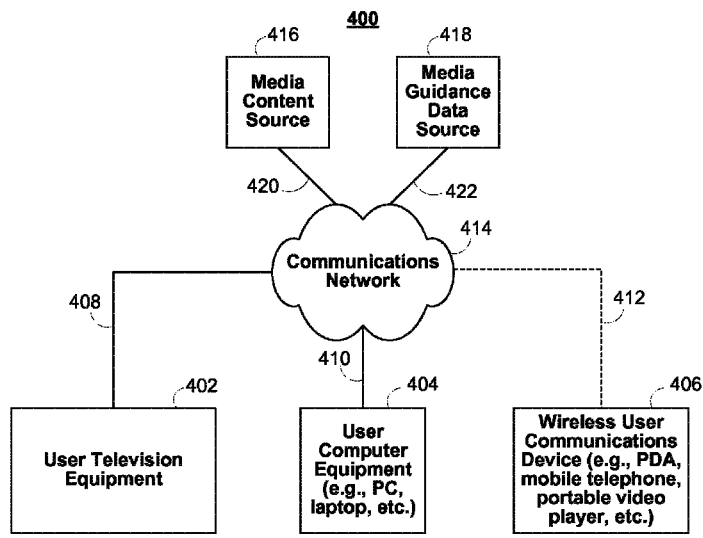
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, an "audio cue" or "sound logo" is defined to be any short sound clip that corresponds to a media asset. An audio cue may come directly from the media asset and/or from content associated with the media asset (e.g., from a commercial). For example, an audio cue may be several measures from a song, a line from an isolated vocal track, a sound effect, or any other appropriate sound clip.

Audio cues may be considered as "sound logos," analogous to traditional visual logos, and should thus be fairly short (i.e., several seconds long). In some cases, the media guidance application may determine (e.g., using control circuitry 304) the maximum length of an audio cue based on the length of the content it is associated with. For example, the media guidance application may set the maximum length of an audio cue to be directly proportional to the length of the content it is associated with. As such, an audio cue corresponding to a movie trailer may be shorter than an audio cue corresponding to a television show, which may in turn be shorter than an audio cue corresponding to a feature film. This proportion may be set according to default programming, based on user preferences, or by any other suitable method.

In other cases, the media guidance application may determine the maximum length of an audio cue based on the rate at which navigation commands have been received from the user (e.g., via user input interface 310). For example, the media guidance application may determine that, over the past hour, the user has been navigating through the media guidance application at a rate of one screen every six seconds. Based on this, the media guidance application may set the maximum length of an audio cue to be less than or equal to this period of time (six seconds) so that it is likely to be presented in full before the screen is changed. The period of time over which the media guidance application monitors the navigation commands to determine this rate may be set according to default programming, by each user individually, or by any other suitable method or entity.

In still other cases, the media guidance application may determine the maximum length of an audio cue to be a given length of time, regardless of other factors (such as those discussed previously). For example, the media guidance application may limit audio cues to five seconds in length by default. In another example, the media guidance application may limit audio cues to 10 seconds in length based on user preferences.

As mentioned previously, the audio cue may come directly from the media asset and/or from content associated with the media asset (e.g., from a commercial). In some cases, the media guidance application may access a database of audio cues for a media asset (e.g., media content source 416 or media guidance data source 418). The audio cues may be selected by the provider of the media asset, the producer of the media asset, other users who have viewed the media asset, the user currently requesting the media asset, or any other appropriate party. In some cases, the media guidance application may generate for display (e.g., on display 312) a list of available audio cues and prompt the user to select a preferred audio cue. The media guidance application may then generate the selected cue for presentation (e.g., using speakers 314) and store the selection (e.g., at storage circuitry 308) for later reference if the same user request is received in the future.

In some cases, the media asset listing may include a metadata file indicating a location for a preferred audio cue. For example, this metadata file may indicate that the preferred audio cue is stored at a certain remote server (e.g., media content source 416 or media guidance data source 418). In another example, the metadata file may indicate that a sound clip to be used as the preferred audio cue occurs at a certain time stamp in the media asset. The media guidance application may then extract the sound clip to be used as the audio clip. This process is discussed in further detail below with regard to FIG. 7. Based on the information in this metadata file, the media guidance application may retrieve the audio cue and generate it for presentation.

As referred to herein, a "commonly taken navigation path" is defined to be a sequence or series of navigation steps taken within the media guidance application. A commonly taken navigation path may be a path through a settings menu, through a set of program listings, or within any other suitable section of the media guidance application. For example, if the media guidance application determines that the user often toggles a certain setting on or off, the path to reach that setting would be a commonly taken navigation path. In another example, if the media guidance application determines that the user often searches for a particular genre or type of content, the process of performing the search and navigating through the results would be a commonly taken navigation path.

In some cases, commonly taken navigation paths may be user-specific. The media guidance application may determine a commonly taken navigation path for a user by monitoring navigation commands received from the user over a period of time (e.g., over the past day or week). The period of time over which the media guidance application monitors the navigation commands may be set according to default programming, by each user individually, or by any other suitable method or entity.

In other cases, the commonly taken navigation paths may be representative of paths taken by multiple users. The media guidance application may determine commonly taken navigation paths for each user at a given user equipment device (such as user television equipment 402) in order to determine commonly taken navigation paths that are shared by the users. The media guidance application may determine that two users share a commonly taken navigation path if they each have a commonly taken navigation path made up of the same constituent navigation commands. Alternately or additionally, the media guidance application may request (e.g., from media guidance data source 418) information about the commonly taken navigation paths of other users. As before, the media guidance application may use this information to determine commonly taken navigation paths that are shared.

The media guidance application may also store information about the commonly taken navigation path (e.g., at storage circuitry 308) for a specified period of time. For example, the media guidance application may store information about the commonly taken navigation path (including but not limited to data such as its constituent commands and the user it is associated with) for the lifetime of the system. In another example, the media guidance application may cause the stored information about the commonly taken navigation path to expire after a certain period of time. In this case, information about older commonly taken navigation paths may be deleted and information about new commonly taken navigation paths added over time as the habits of the users change. The period of time for which information about the commonly taken navigation path is saved may be set according to default programming, by each user individually, or by any other suitable method or entity.

The media guidance application may store any of the commonly taken navigation path information discussed above—commonly taken navigation paths for individual users, commonly taken navigation paths shared by multiple users of a single user equipment device, commonly taken navigation paths shared by multiple users across different devices, or any combination thereof. This information may be used to determine appropriate audio cues for any of these groups as well. For example, the media guidance application may use information about commonly taken navigation paths for an individual user to determine appropriate audio cues for that individual user. In another example, the media guidance application may use information about commonly taken navigation paths for all users of a given user equipment device to determine appropriate audio cues for each individual user of that device.

In some embodiments, the media guidance application may set a maximum length for commonly taken navigation paths. For example, the media guidance application may determine that a sequence of navigation steps corresponds to a commonly taken navigation path only if the sequence comprises fewer than five commands. In another embodiment, the media guidance application may set a maximum length of time in which a commonly taken navigation path may take place. For example, the media guidance application may determine that a sequence of navigation steps corresponds to a commonly taken navigation path only if the sequence of commands is received within a span of 30 seconds. In another example, the media guidance application may determine that a sequence of navigation steps corresponds to a commonly taken navigation path only if each command in the sequence is received within five seconds of the previous command. In still another embodiment, the media guidance application may set a maximum number of generated screens over which a commonly taken navigation path may take place. For example, the media guidance application may determine that a sequence of navigation steps corresponds to a commonly taken navigation path only if the navigation steps take place on a single screen of the media guidance application. These maxima may be set according to default programming, by each user individually, or by any other suitable method or entity.

As referred to herein, a "search request" is defined to be any user input received by the media guidance application that contains an instruction for the media guidance application to find and retrieve a media asset or a listing for a media asset. The media guidance application may determine that a search request includes a criterion that the retrieved media assets or media asset listings must match.

In some embodiments, a search request may be a text, voice, or gesture-based input received by the media guidance application from the user. In some cases, the media guidance application may treat any such input as a search request. In other cases, the media guidance application may treat inputs meeting a certain threshold length as a search request. For example, the media guidance application may only treat text-based inputs at least three characters in length as search requests. This threshold length may be set according to default programming, by each user individually, or by any other suitable method or entity.

In other embodiments, a search request may be a selection of an option within the media guidance application. For example, the media guidance application may determine that the user has selected an option to view content belonging to a specific genre or content that has been recommended for him or her. The media guidance application may treat this selection as a search request.

As referred to herein, a "criterion" is defined to be any term or phrase that can be used to identify a media asset. As discussed previously, the criterion may be a provider, a period of time, playability on a given device, a series, an actor, a title, a genre, a rating, or any other suitable category or identifier or any combination thereof. The media guidance application may receive a user selection of a criterion from a list of available criteria. The media guidance application may determine the list of available criteria (e.g., using control circuitry 304) based on a list of available media assets, or it may receive the list of available criteria from another source (e.g., media guidance data source 418). The media guidance application may also receive an input of a criterion from a user (i.e., not a selection from a defined list) using user input interface 310.

As referred to herein, an "animated image cue" is defined to be any short animated image (e.g., a GIF file) or video clip that corresponds to a media asset. An animated image cue may come directly from the media asset and/or from content associated with the media asset (e.g., from a commercial). For example, an animated image cue may be a clip from a well-known scene or an animation of a title or logo associated with the media asset. The source and maximum length of an animated image cue may be determined as described above for an audio cue. The selection of an appropriate animated image cue is discussed in further detail below.

As referred to herein, an "audio cue playback rule" is defined to be any piece of information that can be used to govern playback of an audio cue. For example, an audio cue playback rule may govern whether or not a specific audio cue may be generated for presentation. In another example, an audio cue playback rule may govern whether or not any audio cue may be generated for presentation multiple times over a certain period of time (e.g., each hour). These rules may be stored locally (e.g., at storage circuitry 308) or retrieved from a database (e.g., media guidance data source 418). In some embodiments, each audio cue may include a metadata file containing audio cue playback rules for that audio cue. These rules may be applied to audio cues, media assets, categories of media assets, or all media assets viewed by a given user. The application of audio cue playback rules is discussed in further detail below with regard to process 718 of FIG. 7.

Figure 5:
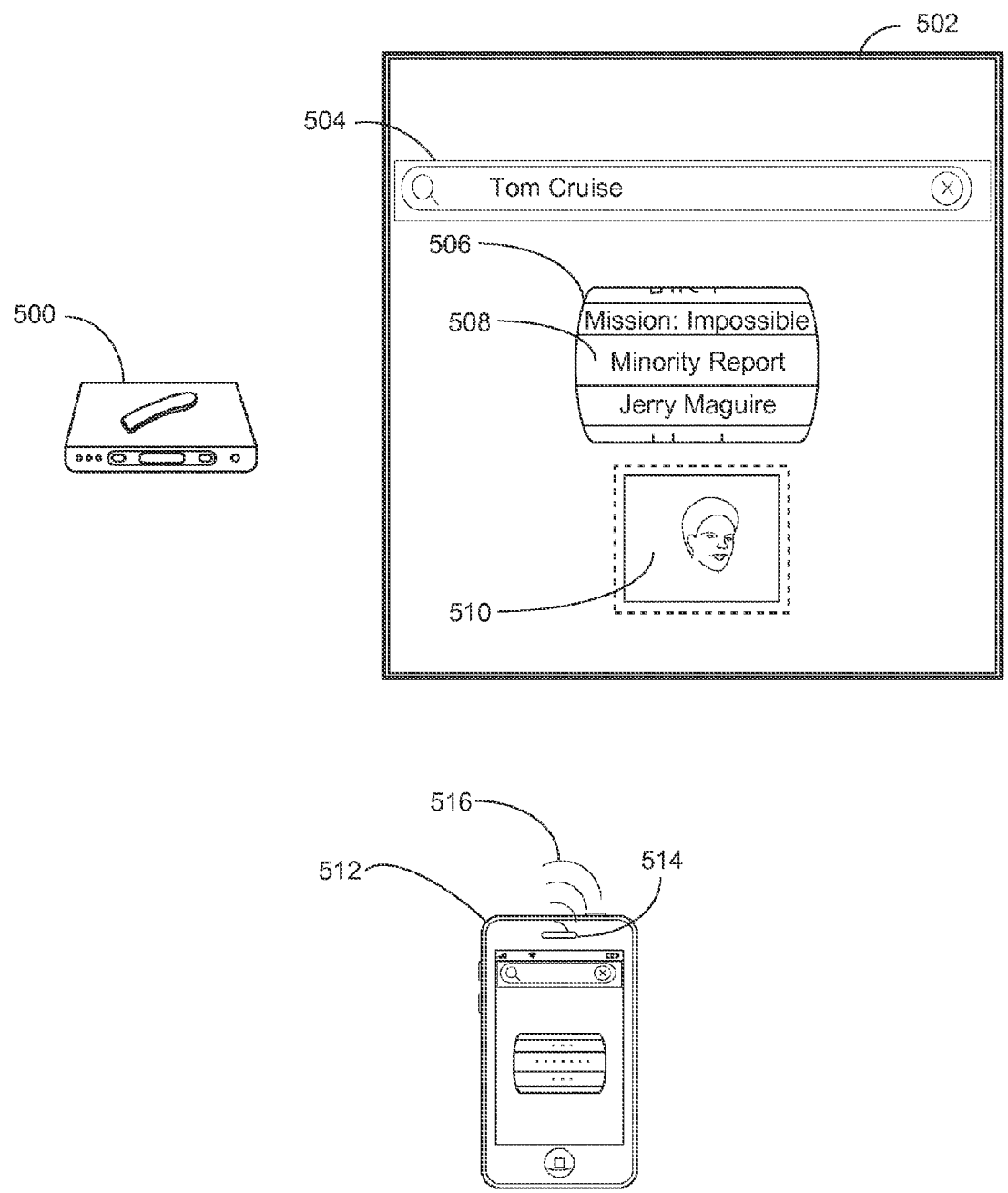
FIG. 5 shows an illustrative example of a plurality of devices featuring a list of media assets in accordance with some embodiments of the disclosure.

FIG. 5 shows an illustrative example of a plurality of devices featuring a list of media assets in accordance with some embodiments of the disclosure. The user devices are first user equipment device 500 and second user equipment device 512, which may be any of user equipment devices 402, 404, or 406.

FIG. 5 shows first user equipment device 500 and second user equipment device 512. First user equipment device 500 has generated for display search screen 502, on which user request 504 is shown. First user equipment device 500 and second user equipment device 512 may be any user equipment, such as user equipment device 402, 404, or 406. Search screen 502 may be displayed on display 312.

In some embodiments, a media guidance application may receive (e.g., using control circuitry 304) a user request for media content based on a criterion. For example, the media guidance application may receive a user request for media content containing a given actor (e.g., Tom Cruise) or from a certain genre (e.g., comedy). The media guidance application may receive user request 504 via user input interface 310 using audio recognition, video recognition (e.g., for a gestural command), touch recognition (e.g., for input on a touchscreen), text, or any other suitable means of communication. User request 504 may be received either locally or from a remote source. For example, the media guidance application, implemented on user equipment device 500, may detect that user request 504, received with user input interface 310, comprises an instruction to search for media content with Tom Cruise. Alternately, user request 504 may be received by the media guidance application via control circuitry 304 of user equipment 500 from a remote source (e.g., from user equipment device 404 by way of communications network 414).

The media guidance application may cross-reference (e.g., using control circuitry 304) the criterion with a database (e.g., media guidance data source 418) listing information about various media assets to determine a list of media assets matching the criterion. Using the previous examples, the media guidance application may determine a list of media assets containing Tom Cruise or from the comedy genre.

The media guidance application may then select (e.g., using control circuitry 304), from the list of media assets, a first media asset (e.g., first result 506). For example, the media guidance application may select the first media asset from the list of media assets. In another example, the media guidance application may determine that a given media asset is of particular relevance to the user and will select that media asset.

The media guidance application may then cross-reference (e.g., using control circuitry 304) the first media asset with the database (e.g., media guidance data source 418) to determine a first audio cue (e.g., audio cue 516) for the first media asset. For example, the media guidance application may cross-reference the first media asset with the database to determine that a well-known sound effect, marketing jingle, or theme is an appropriate first audio cue. The media guidance application may then simultaneously generate (e.g., using control circuitry 304) for presentation (e.g., on first user equipment device 500) the list of media assets and the first audio cue. This may be done without any further user input. Returning to a previous example, the media guidance application may simultaneously generate for presentation a list of movies with Tom Cruise along with the opening bar of the "Mission: Impossible" theme. The media guidance application may not require that the user navigate to a listing for "Mission: Impossible" before generating the audio cue for presentation.

The media guidance application may generate for display, on display 312 of first user equipment device 500 or second user equipment device 512, an illustrative display including first result 506 and second result 508. Simultaneously with the presentation of the list of media assets, the media guidance application may generate for presentation audio cue 516. Audio cue 516 may be generated for presentation using speakers 314 (shown here as integrated speaker 514 of second user equipment device 512).

In some embodiments, the media guidance application may cross-reference (e.g., using control circuitry 304) the first media asset with the database (e.g., media guidance data source 418) to determine a first animated image cue corresponding to the first media asset (e.g., optional animated image cue 510). For example, the media guidance application may cross-reference the first media asset with the database to determine that a certain clip, shot, logo, or other image is related to the media asset. The animated image cue may correspond to the audio cue as well (i.e., they may both be from the same clip or otherwise match). The media guidance application may then generate (e.g., using control circuitry 304) the first animated image cue for display (e.g., on first user equipment device 500) simultaneously with the presentation of the list of media assets and the first audio cue. For example, the media guidance application may simultaneously generate for display a short clip of Tom Cruise operating a computer in "Minority Report" along with the beginning of the movie's theme. The media guidance application may generate optional animated image cue 510 for presentation simultaneously with the list of media assets and audio cue 516, as shown in FIG. 5.

In some embodiments, the media guidance application may monitor (e.g., using control circuitry 304) received user navigation commands over a period of time and determine a commonly taken navigation path based on those commands. Specifically, the media guidance application may track navigation commands (e.g., navigating through program listings display 100) over a specified period of time (e.g., over the past year or since the device was first activated) and determine that a certain set of commands (i.e., defining a path) are often given together. For example, the media guidance application may determine that, over the past week, the monitored user navigation commands often correspond to traversal through a list of search results to a certain set of media assets.

In some embodiments, the media guidance application may receive (e.g., using control circuitry 304) a user input navigating to a second media asset of the list of media assets (e.g., second result 508). For example, the media guidance application may receive a user input that scrolls through the list of search results. The media guidance application may then determine whether the user input corresponds to the commonly taken navigation path. Returning to a previous example, the media guidance application may determine that the user is traversing through the media guidance application as he or she has in the recent past.

The media guidance application may then, in response to this determination, cross-reference (e.g., using control circuitry 304) the second media asset with the database (e.g., media guidance data source 418) to determine a second media cue for the second media asset and generate the second audio cue for presentation (e.g., at first user equipment device 500). This process may be performed as for the first media asset and first audio cue.

In some embodiments, the media guidance application may determine (e.g., using control circuitry 304) a category of content to which the user request corresponds. For example, the media guidance application may determine that a user request for movies containing Tom Cruise may correspond to the "Science-Fiction" category" but not to the "Children's Movies" category. The media guidance application may then retrieve a set of audio cue playback rules for the category of content and base the presentation of the first audio cue on the set of playback rules. For example, if the list of media assets contains both science-fiction movies and children's movies, the media guidance application may not play certain audio cues (e.g., explosions) based on the playback rules for the "Children's Movies" category.

In some embodiments, the media guidance application may determine (e.g., using control circuitry 304), whether the set of audio cue playback rules allows for additional playbacks of audio cues. If it does, the media guidance application may cause additional playbacks of the first audio cue. For example, the media guidance application may determine that the playback rules for the "Children's Movies" category allows for multiple playbacks of audio cues, and so it may cause additional playbacks of the first audio cue as further commands are received. The media guidance application may also disable (e.g., using control circuitry 304) additional playbacks after a period of time. For example, the media guidance application may disable additional audio cue playbacks after two minutes.

In some embodiments, the media guidance application may determine (e.g., using control circuitry 304) a preferred media asset, corresponding to user preferences, from the list of media assets. The media guidance application may then select the first media asset in response to determining that the first media asset corresponds to the preferred media asset. For example, the media guidance application may determine that the user enjoys spy movies based on the user's profile. Returning to a previous example, the media guidance application may determine that "Mission: Impossible" would be a preferred media asset for a user request for movies with Tom Cruise. The media guidance application may then select "Mission: Impossible" as the first media asset for cross-referencing to determine an audio cue.

In some embodiments, the media guidance application may, in response to determining that no audio cue is available for the first media asset (e.g., first result 506), cross-reference (e.g., using control circuitry 304) the first media asset with the database (e.g., media guidance data source 418) to determine a sound associated with the media asset. For example, the media guidance application may determine, based on this operation, that no audio cue is available but that a certain sound is commonly associated with the media asset. The media guidance application may then extract the sound from the first media asset for use as the first audio cue. For example, the media guidance application may access an available on-demand version of the media asset, locate the identified sound, and extract it.

Figure 6:
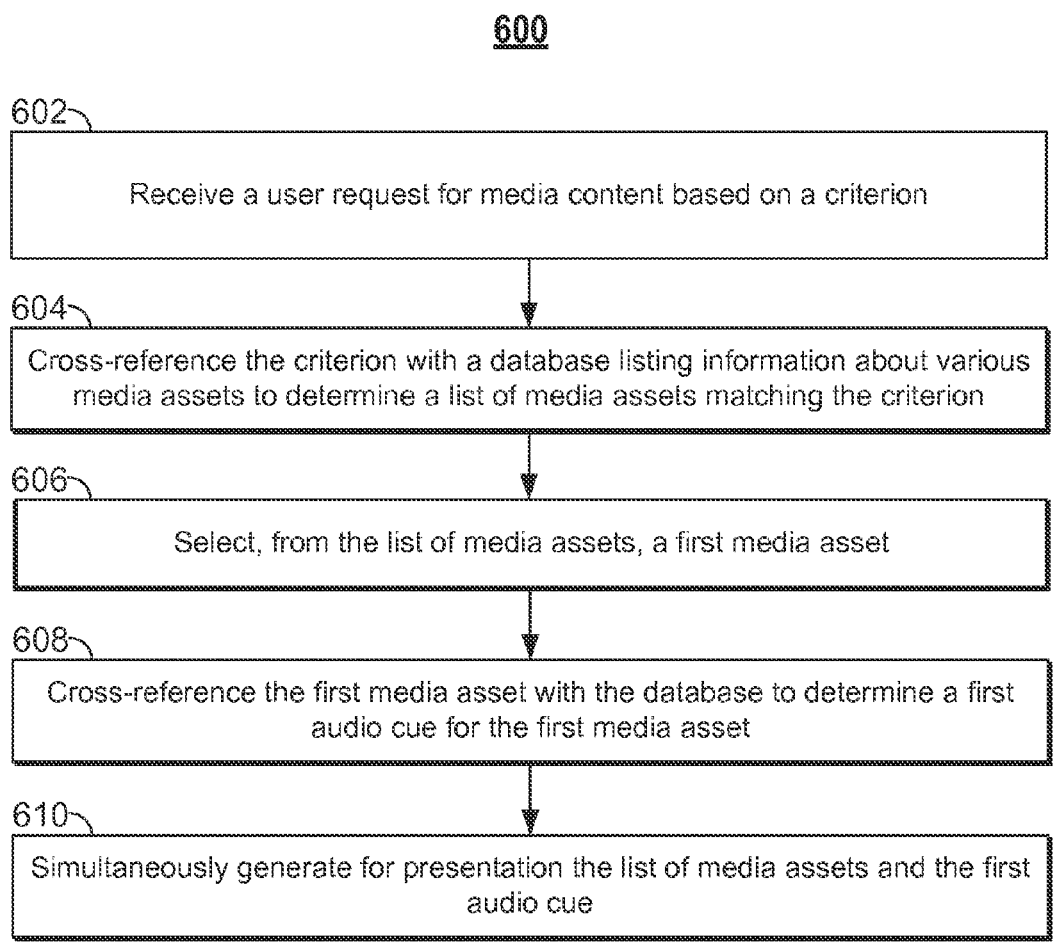
FIG. 6 is a flowchart of illustrative steps for presenting an audio cue in accordance with some embodiments of the disclosure.

FIG. 6 is a flowchart of illustrative steps for presenting an audio cue in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) to present an audio cue. In addition, one or more steps of process 600 may be incorporated into or combined with one or more steps of any other process or embodiment.

At 602, the media guidance application receives (e.g., using control circuitry 304) a user request for media content based on a criterion. The user request may be received locally (e.g., via user input interface 310) as a text input, a voice input, a gestural input, or via any other suitable input method or combination thereof. The user request may also be received from a remote source (e.g., via communications network 414). The criterion may be any aspect or attribute of media content that can be used to identify or categorize said content. Examples of such criteria include but are not limited to genre, rating, content type (television serial, movie, etc.), and lead actor or actress. For example, first user equipment device 500 may receive user request 504 on search screen 502 via user input interface 310.

At 604, the media guidance application cross-references (e.g., using control circuitry 304) the criterion with a database listing information about various media assets to determine a list of media assets matching the criterion. The database may be local (e.g., stored at storage circuitry 308) or remote (e.g., media guidance data source 418 accessed via communications network 414) to the media guidance application (e.g., as implemented on first user equipment device 500 or second user equipment device 512). For example, the media guidance application may cross-reference user request 504 (as shown, "Tom Cruise") against this database to determine a list of media assets comprising first result 506 (as shown, "Mission: Impossible") and second result 508 (as shown, "Minority Report").

At 606, the media guidance application selects (e.g., using control circuitry 304), from the list of media assets, a first media asset. As discussed previously, the media guidance application may select the first asset from the list, a preferred asset based on user preferences, or any other media asset from the list of media assets based on any suitable criteria. For example, the media guidance application may select first result 506 as the first media asset.

At 608, the media guidance application cross-references (e.g., using control circuitry 304) the first media asset with the database to determine a first audio cue for the first media asset. As discussed previously, the playback and selection of the audio cue may be based on audio cue playback rules for the category of content to which the user request corresponds. The media guidance application may select the audio cue by default, according to user choice or preferences, based on the list of media assets as a whole, or based on any other suitable criteria or any combination thereof. For example, if the media guidance application selects first result 506 as the first media asset ("Mission: Impossible," as shown), then the media guidance application may, based on the cross-referencing operation at 608, determine that a clip from the movie's theme is an appropriate first audio cue. In another example, the media guidance application may determine that a quote from or related to user request 504 (but not necessarily directly from any of the media assets from the list of media assets) is an appropriate first audio cue, since it relates to the list of media assets as a whole.

At 610, the media guidance application simultaneously generates (e.g., using control circuitry 304) the list of media assets and the first audio cue (e.g., audio cue 516) for presentation. The list of media assets may be generated for display in search screen 502 (e.g., on display 312) or on a separate screen. Audio cue 516 may be generated for presentation using speakers 314 (as implemented into second user equipment device 512 as integrated speaker 514). The media guidance application generates the list and the audio cue for presentation simultaneously without waiting to receive from the user a particular navigation or selection command.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
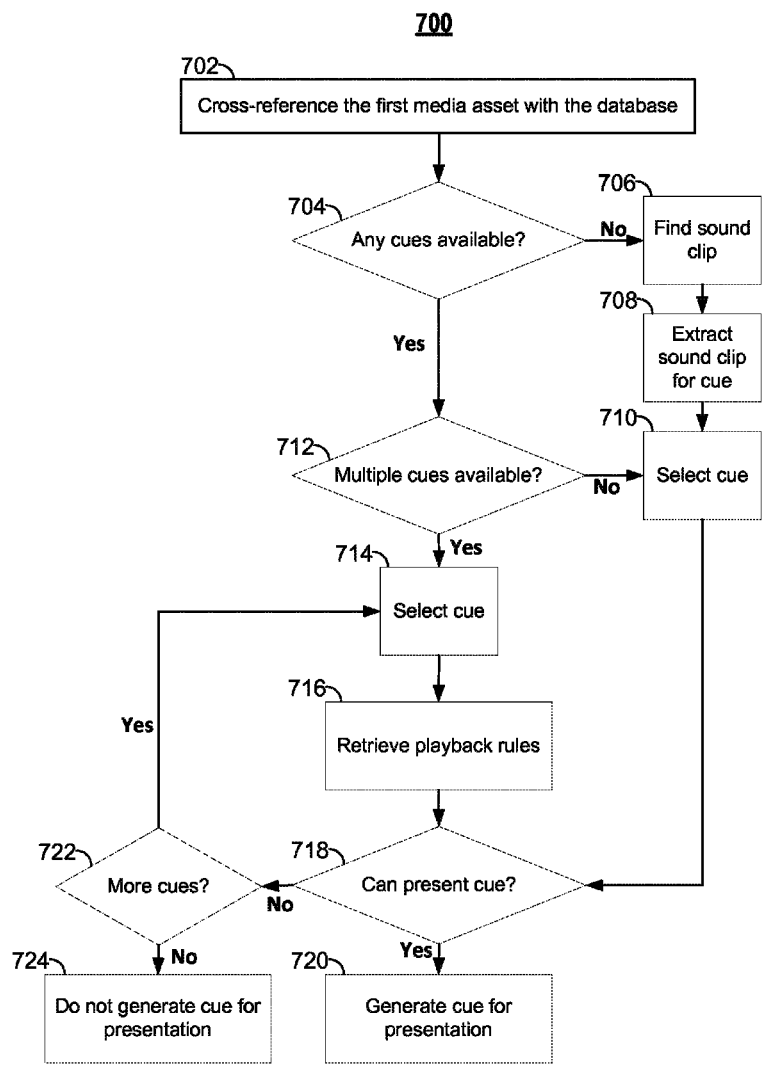
FIG. 7 is a flowchart of illustrative steps for selecting an audio cue in accordance with some embodiments of the disclosure.

FIG. 7 is a flowchart of illustrative steps for selecting an audio cue in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry implemented on user equipment 402, 404, and/or 406 (FIG. 4) to select an audio cue. In addition, one or more steps of process 700 may be incorporated into or combined with one or more steps of any other process or embodiment.

At 702, the media guidance application cross-references (e.g., using control circuitry 304) the first media asset with the database. As at 608, process 702 may take place after a first media asset has been selected from the list of media assets retrieved in response to the user request for media content.

At 704, the media guidance application determines, using control circuitry 304, if any audio cues are available. If no audio cues are available from the database, the media guidance application may proceed to 706. At 706, the media guidance application may identify a sound clip associated with the media asset. The media guidance application may do this by cross-referencing (e.g., using control circuitry 304) the first media asset with the database to determine a sound associated with the first media asset. For example, the media guidance application may determine, based on this cross-referencing, that a certain sound effect is commonly associated with the first media asset (even though it was not available as an audio cue, as determined at 704).

Once a sound clip has been identified, the media guidance application may proceed to 708. At 708, the media guidance application may extract the sound clip from the media asset. For example, the media guidance application may access a stored version of the media asset (e.g., located at storage circuitry 308), extract the sound clip (e.g., using control circuitry 304), and store it for later use (e.g., at storage circuitry 304 or at a remote server accessed via communications network 414). The media guidance application may find the sound clip within the media asset based on a time stamp received from the database, by locating it based on an audio watermark received from the database, or using any other appropriate method or combination thereof. Once the sound clip is extracted, the media guidance application may proceed to 710, where it may select the extracted sound clip to be the first audio cue (e.g., audio cue 516).

If the media guidance application determines (at 704) that an audio cue is available, the media guidance application may proceed to 712. At 712, the media guidance application may determine if multiple audio cues are available. If only one audio cue is available, the media guidance application may proceed as described above to 710 and select the audio cue.

If multiple cues are available, the media guidance application may proceed to 714. At 714, the media guidance application may select one cue from the multiple available cues. In some cases, the media guidance application may select a cue at random from the multiple available cues. In some cases, the media guidance application may, using control circuitry 304, determine an order of the multiple available cues and select one cue based on that order. In other cases, the media guidance application may select the audio cue based on user preferences. For example, the media guidance application may determine that the user has indicated that he or she prefers that sound effects be used as audio cues. If the media guidance application determines that the audio cues available for a media asset include a quote, a music clip, and a sound effect, the media guidance application may then select the sound effect.

The media guidance application may also select an audio cue based on user request 504 or the list of the media assets matching the criterion in user request 504. For example, as discussed previously, the media guidance application may determine that one audio cue from the multiple identified audio cues relates to user request 504 but is not necessarily directly from any of the media assets from the list of media assets. The media guidance application may then select that audio cue as it relates to the list of media assets as a whole.

The media guidance application may also select an audio cue based on further commands received from the user. As discussed previously, the media guidance application may receive a user input that navigates through the list of search results or, more generally, through the media guidance application. The media guidance application may then determine whether the user input corresponds to a commonly taken navigation path. The media guidance application may then, using control circuitry 304, select an audio cue that has been selected in conjunction with the commonly taken navigation path in the past.

At 716, the media guidance application may retrieve (e.g., using control circuitry 304) audio cue playback rules. These playback rules may be associated with the content category to which the user request belongs. The media guidance application may determine the category to which the user request belongs by cross-referencing the user request itself (such as user request 504) against the database or by cross-referencing the corresponding list of media assets against the database. By doing so, the media guidance application may determine that the user request itself belongs to a category or that a certain proportion or number of media assets from the list of media assets belongs to a category.

For example, by cross-referencing a user request such as "Family Comedies" with the database, the media guidance application may determine that the user request belongs to the category "Family-Friendly." Conversely, the media guidance application may determine that a user request such as "Horror Films" does not belong to that category. In another example, the media guidance application may determine that user request 504 (for "Tom Cruise") belongs to the category "Action Movies" because a certain proportion or number of media assets corresponding to that request are action movies. The threshold proportion or number may be set by default programming, by the user, or by any other suitable method or entity.

At 718, the media guidance application may determine, using control circuitry 304 and based on the retrieved playback rules, whether the selected cue may be presented. The media guidance application may do this by determining whether the selected cue is allowed or disallowed by the retrieved playback rules. Audio cues may be allowed or disallowed based on a type or cue, on an individual basis, or based on any other suitable criteria or combination thereof. For example, the media guidance application may determine that the retrieved playback rules allow only audio cues based on sound effects to be generated for presentation. In another example, the media guidance application may determine that individual audio cues are disallowed according to the retrieved playback rules (such as frightening or startling audio cues for the "Family-Friendly" category).

The media guidance application may also determine that the selected cue is allowed or disallowed based in part on a user profile or user preferences. For example, the media guidance application may determine that the selected audio cue is disallowed for users below a given age. In another example, the media guidance application may determine that the selected audio cue is of a type that the user prefers not to hear.

If the media guidance application determines that the playback rules allow for the cue to be presented, the media guidance application may proceed to 720 and generate the audio cue (e.g., audio cue 516) for presentation (e.g., using integrated speaker 514). If the media guidance application determines that the playback rules do not allow for the selected cue to be presented, the media guidance application may proceed to 722. At 722, the media guidance application may determine whether additional audio cues are available (e.g., if it was determined at 712 that multiple cues are available). If the media guidance application determines that no additional cues are available, the media guidance application may proceed to 724. At 724, the media guidance application does not generate an audio cue for presentation (and thus no audio cue is presented with the list of media assets). If the media guidance application determines that additional cues are available, the media guidance application may return to 714 to select a different audio cue.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or a conventional ROM device, or a random access memory, such as a hard drive device or a computer diskette, having a computer-readable program code stored thereon. It should also be understood that methods, techniques, and processes involved in the present invention may be executed using processing circuitry. For instance, identification of a source of the portion of the media asset may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset correspondences as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for presenting an audio cue, the method comprising:
   receiving a user request for media content based on a criterion;
   retrieving, based on the criterion, from a database information about various media assets to determine a list of media assets matching the criterion;
   generating a display that includes a plurality of media asset identifiers corresponding to the list of media assets;
   receiving a user input that visually distinguishes a first media asset identifier from the plurality of media asset identifiers, wherein the first media asset identifier corresponds to a first media asset;
   retrieving, based on the first media asset identifier, from the database a first audio cue that identifies content associated with the first media asset; and
   in response to receiving the user input, simultaneously generating for presentation the plurality of media asset identifiers, including the visually distinguished first media asset identifier, and the first audio cue that identifies content associated with the first media asset.

2. The method of claim 1, wherein the plurality of media asset identifiers and the first audio cue are simultaneously generated for presentation without further user input after receiving the user request.

3. The method of claim 1, further comprising:
   cross-referencing the first media asset with the database to determine a first animated image cue corresponding to the first audio cue for the first media asset; and
   generating for display the first animated image cue simultaneously with the presentation of the plurality of media asset identifiers and the first audio cue.

4. The method of claim 1, further comprising:
   monitoring received user navigation commands over a period of time; and determining a commonly-taken navigation path based on the user navigation commands.

5. The method of claim 4, further comprising:
receiving a user input navigating to a second media asset of the list of media assets;
determining whether the user input corresponds to the commonly-taken navigation path;
in response to determining that the user input corresponds to the commonly-taken navigation path, cross-referencing the second media asset with the database to determine a second audio cue for the second media asset; and
generating for presentation the second audio cue.

6. The method of claim 1, further comprising:
determining a category of content to which the user request corresponds; and
retrieving a set of audio cue playback rules for the category of content, wherein the presentation of the first audio cue is based on the set of audio cue playback rules.

7. The method of claim 6, further comprising:
determining whether the set of audio cue playback rules allows for additional playbacks of audio cues; and
causing additional playbacks of the first audio cue.

8. The method of claim 7, further comprising disabling additional playbacks after a period of time.

9. The method of claim 1, further comprising:
determining a preferred media asset from the list of media assets, wherein the preferred media asset corresponds to user preferences; and
selecting the first media asset in response to determining that the first media asset corresponds to the preferred media asset.

10. The method of claim 1, further comprising:
in response to determining that no audio cue is available for the first media asset, cross-referencing the first media asset with the database to determine a sound associated with the first media asset; and
extracting the sound from the first media asset for use as the first audio cue.

11. A system for presenting an audio cue, the system comprising:
storage circuitry configured to store a database listing information about various media assets; and
control circuitry configured to:
receive a user request for media content based on a criterion;
retrieve, based on the criterion, from the database information about various media assets to determine a list of media assets matching the criterion;
generate a display that includes a plurality of media asset identifiers corresponding to the list of media assets;
receive a user input that visually distinguishes a first media asset identifier from the plurality of media asset identifiers, wherein the first media asset identifier corresponds to a first media asset;
retrieve, based on the first media asset identifier, from the database a first audio cue that identifies content associated with the first media asset; and
in response to receiving the user input, simultaneously generate for presentation the plurality of media asset identifiers, including the visually distinguished first media asset identifier, and the first audio cue that identifies content associated with the first media asset.

12. The system of claim 11, wherein the plurality of media asset identifiers and the first audio cue are simultaneously generated for presentation without further user input after receiving the user request.

13. The system of claim 11, wherein the control circuitry is further configured to:
cross-reference the first media asset with the database to determine a first animated image cue corresponding to the first audio cue for the first media asset; and
generate for display the first animated image cue simultaneously with the presentation of the plurality of media asset identifiers and the first audio cue.

14. The system of claim 11, wherein the control circuitry is further configured to:
monitor received user navigation commands over a period of time; and
determine a commonly-taken navigation path based on the user navigation commands.

15. The system of claim 14, wherein the control circuitry is further configured to:
receive a user input navigating to a second media asset of the list of media assets;
determine whether the user input corresponds to the commonly-taken navigation path;
in response to determining that the user input corresponds to the commonly-taken navigation path, cross-reference the second media asset with the database to determine a second audio cue for the second media asset; and
generate for presentation the second audio cue.

16. The system of claim 11, wherein the control circuitry is further configured to:
determine a category of content to which the user request corresponds; and
retrieve a set of audio cue playback rules for the category of content, wherein the presentation of the first audio cue is based on the set of audio cue playback rules.

17. The system of claim 16, wherein the control circuitry is further configured to:
determine whether the set of audio cue playback rules allows for additional playbacks of audio cues; and
cause additional playbacks of the first audio cue.

18. The system of claim 17, wherein the control circuitry is further configured to disable additional playbacks after a period of time.

19. The system of claim 11, wherein the control circuitry is further configured to:
determine a preferred media asset from the list of media assets, wherein the preferred media asset corresponds to user preferences; and
select the first media asset in response to determining that the first media asset corresponds to the preferred media asset.

20. The system of claim 11, wherein the control circuitry is further configured to:
in response to determining that no audio cue is available for the first media asset, cross-reference the first media asset with the database to determine a sound associated with the first media asset; and
extract the sound from the first media asset for use as the first audio cue.

* * * * *